Aug. 11, 1931.                F. B. PFEIFFER                1,817,929
                FABRIC SLITTING AND STRIP EDGING APPARATUS
                    Filed April 2, 1929        4 Sheets-Sheet 3
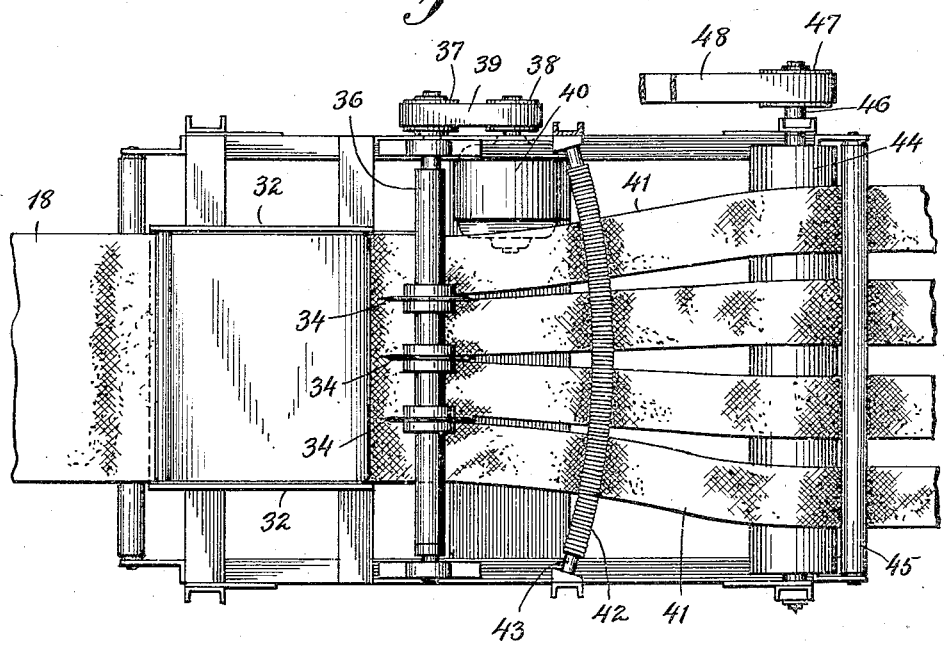
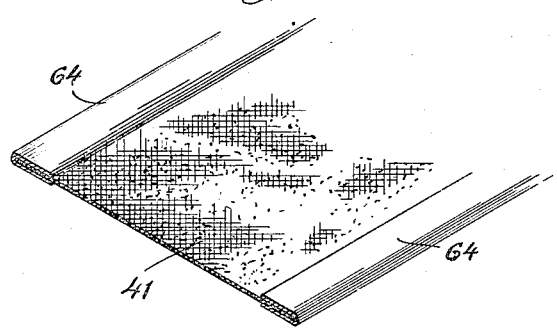

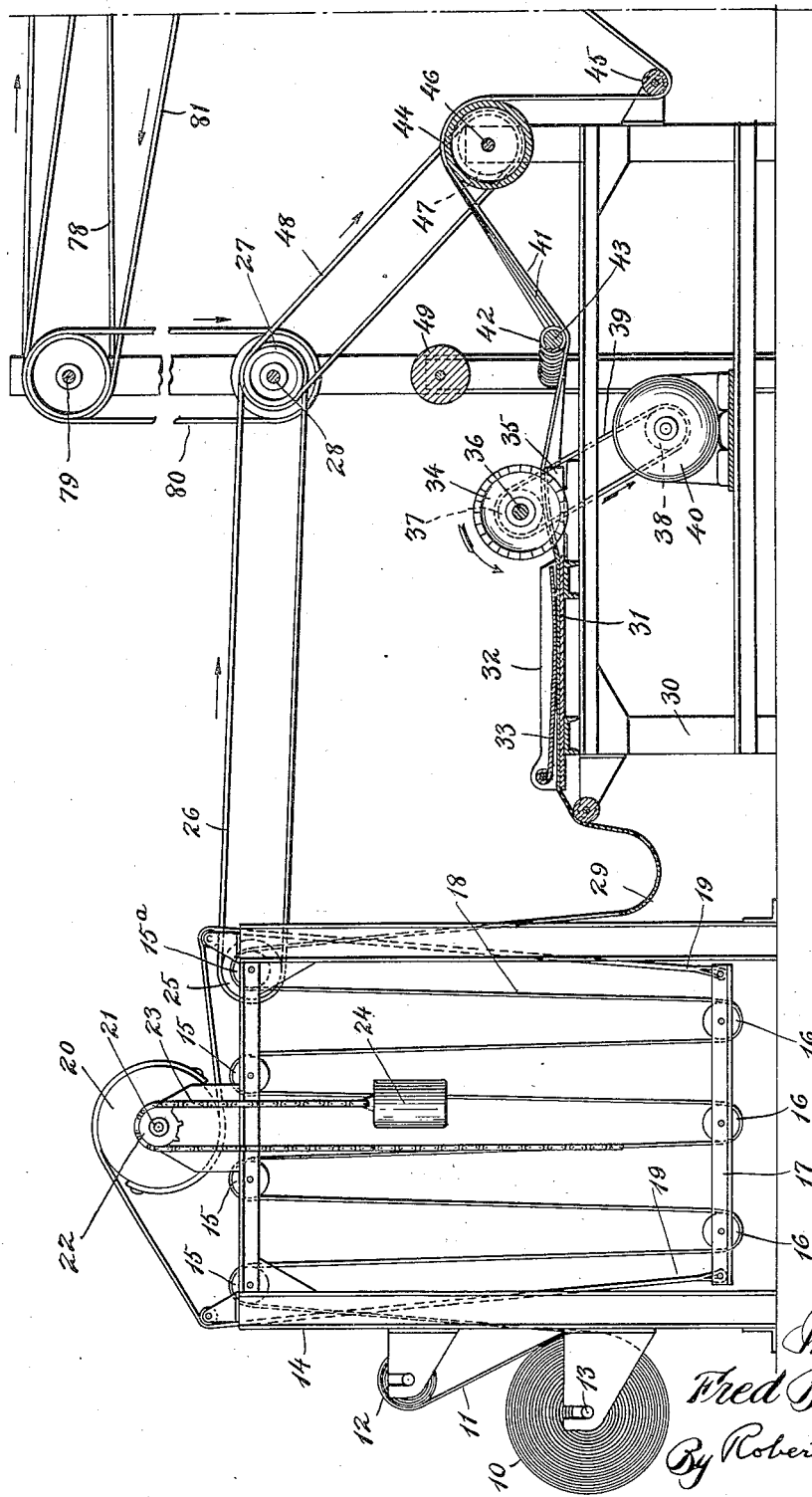

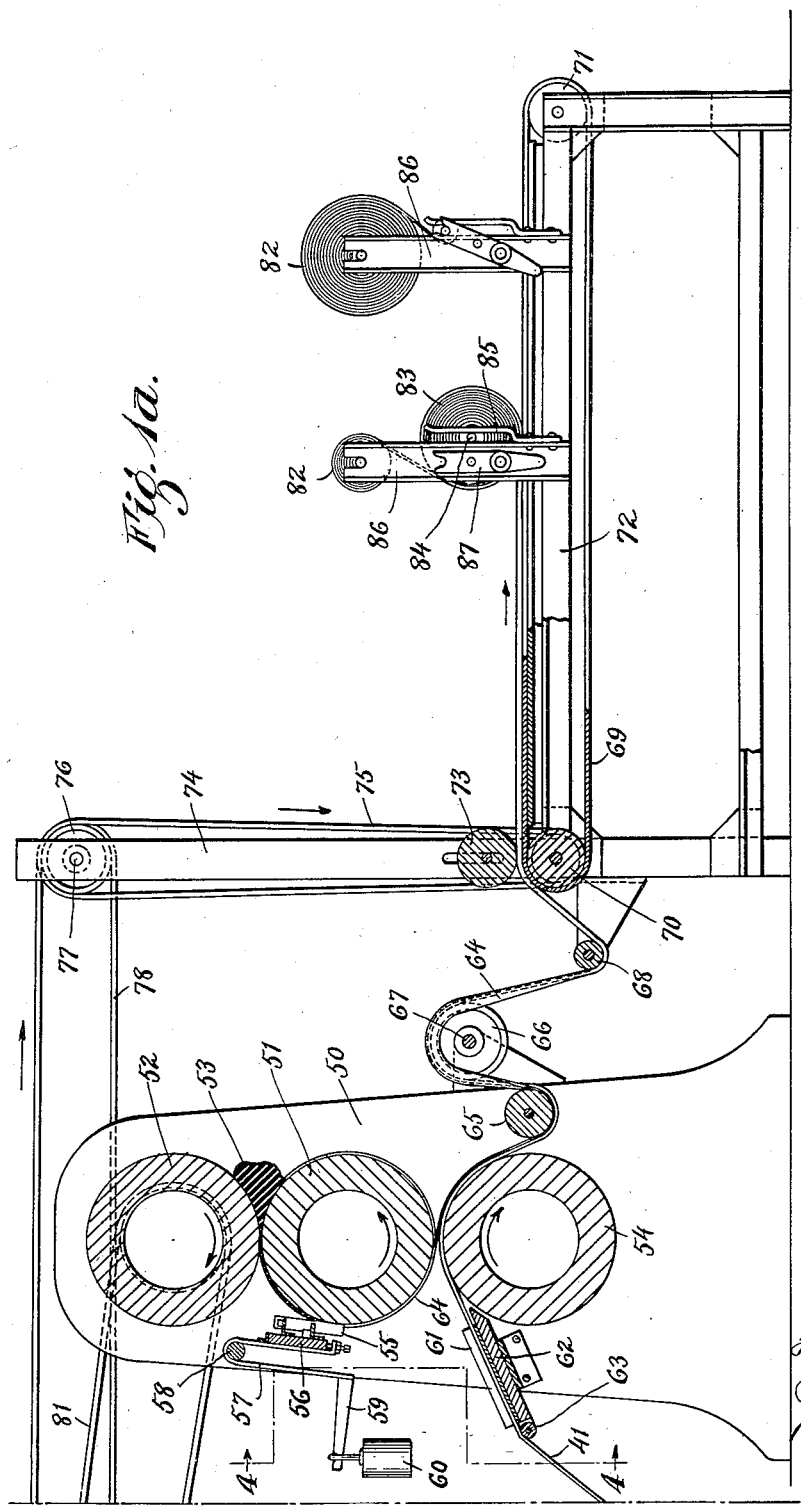

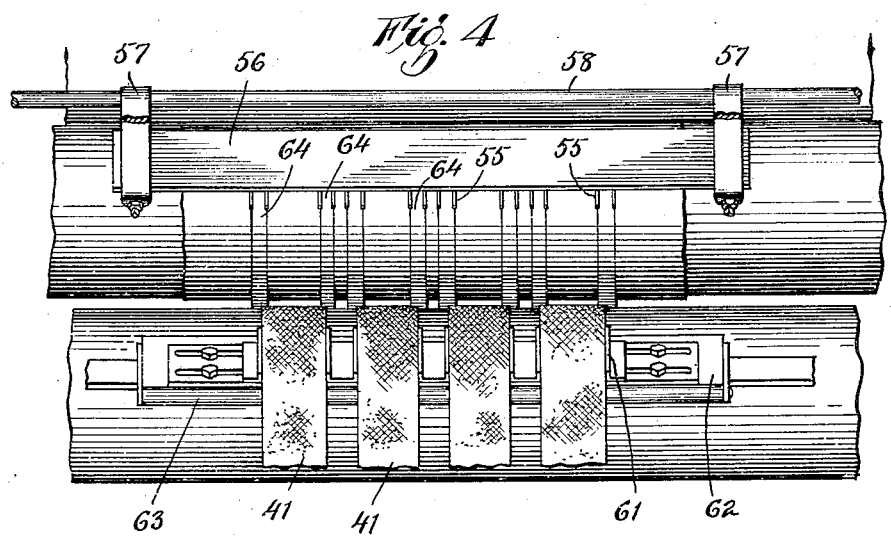
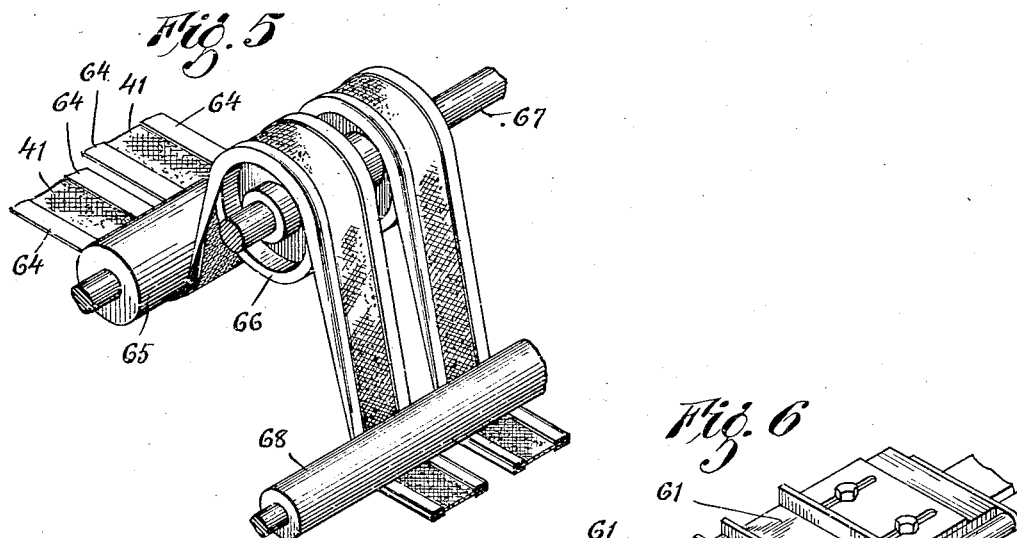
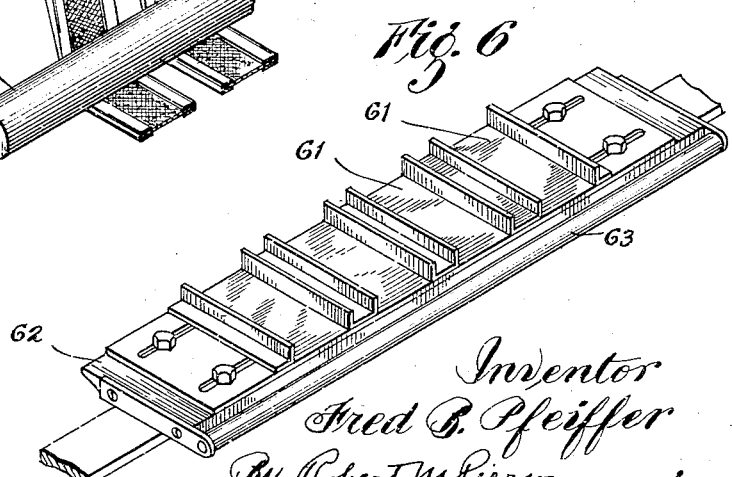

Patented Aug. 11, 1931

1,817,929

UNITED STATES PATENT OFFICE

FRED B. PFEIFFER, OF AKRON, OHIO, ASSIGNOR TO SEIBERLING RUBBER COMPANY, OF BARBERTON, OHIO, A CORPORATION OF DELAWARE

FABRIC SLITTING AND STRIP EDGING APPARATUS

Application filed April 2, 1929. Serial No. 351,914.

This invention relates to the art of preparing gum-faced strips of sheet material, especially rubber-edged strips of bias woven fabric for use in pneumatic tire beads, although the invention may also apply to other uses.

My object is to co-ordinate in a single continuous operation the steps required in dividing a relatively-wide strip of fabric or other sheet material into a number of narrower strips and applying gum facings to said strips in a suitable manner, as by adhesively affixing them to the margin or margins of the fabric strips on one face of the latter, turning them around the edge and adhesively affixing them to the opposite face so that the fabric edge will be encased in rubber compound or other suitable plastic and the material rendered suitable for making flipper or chafer strips in tire manufacture, or for any other appropriate purpose. This general operation may involve subordinate steps contributing to the desired result as will hereinafter appear.

Heretofore the steps involved in dividing a wide strip of bias fabric into narrower strips have never, so far as I am aware, been co-ordinated with those of applying a gum facing or edging or similar lamination to the fabric in a rubber calender or otherwise, but intermediate storing and handling steps have been required which are eliminated by my invention. The inventon therefore accomplishes a large saving in time and labor, besides affording greater uniformity of product and other desirable improvements.

Of the accompanying drawings, Fig. 1 is a side elevation showing approximately one-half of an apparatus constructed and co-ordinated in accordance with my invention and including devices for feeding and slitting the fabric.

Fig. 1ª is a similar view showing the other half of the apparatus including the rubber calender and appurtenant devices for applying the gum edgings to the fabric strips and rolling up the completed strips.

Fig. 2 is a plan view of the slitting devices.

Fig. 3 is a perspective view of one of the rubber-edged strips.

Fig. 4 is a front elevation of a portion of the calender and adjacent strip-guides and gum cutters on the entrance side.

Fig. 5 is a perspective of the strip material on the exit side of the calender showing one form of device which may be employed for turning under the gum edging strips.

Fig. 6 is a perspective view showing a multiple fabric strip guide employed on the entrance side of the calender.

Instead of cutting to their ultimate width, on a bias cutter, the rubber-frictioned, woven fabric strips required for gum edging, I cut a number of lengths of such bias fabric of a width adapted to make several of such ultimate strips, four in the illustration here given, piece them together into a longer length by splicing at their ends, and wind this long length of wide bias fabric into a roll, together with a liner to prevent sticking, for introduction to the apparatus illustrated in the drawings. Such a roll of material is shown at 10 in Fig. 1, and 11 is the liner, withdrawn from said roll as the latter unwinds, and rewound into a separate roll 12. The trunnions 13 of roll 10 are supported in slotted brackets on the frame 14 of a festooning device which includes an upper series of stationarily-mounted idle rollers 15 and a lower series of similar rollers 16 mounted in a floating frame 17, the wide strip of fabric 18 passing in series over and under these rollers. The frame 17 is suspended by its corners from a series of four straps 19, two of which are shown in Fig. 1, and the upper ends of said straps are attached to a pair of drums 20, one of which is illustrated, at opposite ends of the diameter of each of said drums. The drums are secured to a shaft 21 on which is a sprocket wheel 22 engaging a chain 23 from one end of which is suspended a counter-weight 24 tending to wind up the straps on the drum and elevate the floating frame 17 when there is sufficient pull on the fabric, the other end of said chain hanging free. The final roll 15ª in the upper row is power driven by a pulley 25 on its shaft from a belt 26 running over a pulley 27 on a counter-shaft 28.

As long as the fabric is freely supplied from the roll 10, the floating frame 17 remains in its lower position, since its weight and that of the rollers 16 is sufficient to overcome the counter-weight 24, and the fabric loops retain their maximum length. When the supply roll runs out, however, the rear or trailing end of the fabric strip may be held or arrested in a suitable manner at the entrance of this festooning device while the leading end of the strip from a fresh roll is being spliced thereto, without interrupting the feed of said fabric at the exit end, since the loops afford a reservoir of fabric from which the supply may take place while a fresh roll is being substituted and the splice made, the floating frame 17 meanwhile rising in response to the call of the power-driven feed roll 15ᵃ to automatically shorten said loops.

Between the festooning device and the slitter, the fabric 18 falls in a loop 29. 30 is a frame supporting the slitting devices, which are preferably constructed and operated in the manner illustated in my co-pending application, Serial No. 351,912, filed concurrently herewith. Briefly, such devices and their appurtenances include a fixed, horizontal lower fabric-supporting plate 31, and a pivoted upper guide-plate 33 resting by its weight on the fabric; a series of three rotary toothed knives or saw-like cutter disks 34 operating in slots between individual, raised-edge fabric guides 35 on the forward end of the plate 31 and mounted on a shaft 36 which is rapidly rotated in the direction of the arrow in Fig. 1 by pulleys 37, 38 and a belt 39 from the shaft of an electric motor 40, so that the lower peripheries of the cutter disks travel in the general direction of feed of the fabric and contribute to, or at least do not oppose its feeding movement while the cutters divide the wider strip 18 into four individual strips 41 of the desired ultimate width; a strip-spreading device in the form of a forwardly-bowed wire roller 42 mounted to turn freely on a fixed arcuate bar 43; a power-driven feed roller 44 for the individual strips and an idle roller 45 under which they pass to the calender. Feed roller 44 has affixed to its shaft 46 a pulley 47 driven by a belt 48 from the pulley 27 or its mate of the same diameter on counter-shaft 28. The driving of the feed rollers 15ᵃ and 44 from the same counter-shaft 28 together with a proper proportioning of surface speeds serves to synchronize the outfeed from the festooning device with that from the cutting apparatus, so that the speed is substantially the same at these two points and the fabric passes the cutting point without substantial tension. The slitting of the fabric by means of knives whose direction of rotation coincides with the travel of the fabric, and the avoidance of substantial tension on the fabric which would tend to lengthen it and decrease its width, enables me to deliver to the calender strips of exact and uniform width well suited for use as flippers and chafing strip in tire manufacture or for other purposes.

Above the wire spreading-roller 42, between suitable frame standards, is mounted an idle roller 49 for guiding fabric which it may be desired to subject to the calendering operation without passing it through the slitter.

For forming and applying the gum edging strips to the individual fabric strips 41, I may provide any appropriate means such as the three-roll calender 50 shown in Fig. 1ᵃ, together with suitable auxiliary devices, 51 being the middle or gum-sheeting roll of said calender, 52 the upper roll for forming a bank 53 of rubber compound with the roll 51, on the rear side of the calender, and 54 being the lower or fabric roll separated from roll 51 by a sufficient space for the passage of the fabric and gum strips. The three calender rolls are inter-geared in the usual manner by gearing not shown. By the action of the calender, a mass of plastic rubber compound is rolled into a sheet on the middle roll and said sheet is then divided into strips of the desired width by the action of a gang of suitably-spaced knives 55 mounted in a holder 56 which is suspended by hooks 57 from a frame bar 58 of the calender, said hooks being provided with arms 59 on which are hung weights 60 for pressing the knives through the gum sheet and against the middle roll 51. The particular construction of this gang knife-holder and mode of associating it with the calender are made the subject of a separate application filed by me concurrently herewith, Serial No. 351,913.

From the roller 45 shown in Fig. 1, the fabric strips 41 are led through rectangular trough-shaped guides 61 mounted in parallel relation at an upward inclination upon a board or holder 62 in front of the lower calender roll 54, the strips first passing over a wide idle roller 63 and being then directed by the guides into the space between the middle and lower calender rolls, in a properly spaced-apart relation. The knives 55 divide the gum sheet into strips of which certain ones 64 having the desired width and location are brought down upon the margins of each of the rubber-frictioned fabric strips 41 in overlapped relation to the latter as seen in Fig. 4, one on each margin in the illustration given, and are caused to adhere to said fabric strips by the stickiness of the rubber compound. In some cases the gum strip is placed on only one margin of the fabric strip.

The plied fabric and rubber strips then pass partly around the lower calender roll 54, under a wide idle roller 65 and thence upwardly, partly around and downwardly over a series of individual idle rollers 66 mounted on a shaft 67 and having substantially the same width as the fabric strips 41. The fabric being then under a slight tension, the projecting portions of the rubber strips 64 automatically fold downwardly across the edges of the fabric strips, whereupon the fold is automatically completed and the free margins of the gum strips are turned inwardly under the fabric strips and caused to adhere thereto by the passage of the plied strips under a wide idle roller 68. I do not claim as my invention this specific arrangement of rollers for folding the gum strips around the edges of the fabric strips and may substitute any other suitable means of performing this step in the series of operations.

From the roller 68, the series of parallel-moving, gum-edged strips passes upwardly onto a carrier belt 69 supported by rollers 70, 71 located at opposite ends of a table or framework 72. A presser roller 73 mounted in vertical guide slots on standards 74 and resting by gravity on the strips, over the roller 70, furnishes a compacting pressure which perfects the adhesion of the gum strips upon the fabric strips. The roller 70 is power driven by a pulley on its end, through a belt 75 passing over a pulley 76 on a shaft 77 journaled in the standards 74, and a belt 78 connecting pulley 76 with another pulley on a counter-shaft 79 mounted over the shaft 28 from which the roller 15ª and 44 are driven, the two shafts 28 and 79 being connected by suitable pulleys and a belt 80. Counter-shaft 79 is driven by a wheel or pulley thereon, through a belt or chain 81 connected with a wheel or pulley on the shaft of the upper calender roll 52, the calender itself being driven in any suitable manner, as by means of an electric motor geared thereto. In this way the surface speeds of the three power-driven fabric-propelling rollers 15ª, 44 and 70 are properly co-ordinated with each other and with that of the calender rolls to advance the fabric progressively and at the desired speed through the apparatus. The surface speeds of rollers 15ª, 44 and 54 will be substantially the same, while that of roller 70 is slightly greater so as to impart a small tension to the fabric in passing from the calender around the rolls 65, 66, 68 to facilitate the folding of the gum strips around the edges of the fabric strips.

The travel of the gum-edged strips with the upper stretch of the carrier belt 69 over the table 72 affords an opportunity for inspection of the work and manual correction of any imperfections in the application and folding of the gum strips, by an operator stationed at said table. The gum-edged strips are finally rolled up with a liner 82 into a roll 83 by the turning action of the carrier belt 69 upon said roll, the spindle 84 of which rises in vertical guides 85 on frame standards 86 as the roll builds up. When the roll is full, its core may be temporarily supported by notched latches 87 pivoted to the standards until said roll is lifted out and an empty core substituted for winding a fresh roll. Preferably a duplicate pair of standards 86 with means for supporting the cores for a second liner 82, and for a second roll of finished material as it is wound up in said liner in the manner described, is provided in tandem relation with the first pair, for alternate operation therewith, so that the rolling-up may proceed without interruption.

Summarizing the operation, a roll 10 of spliced lengths of bias-cut, rubber-frictioned, woven fabric is mounted at the entrance of the festooning rack 14 and its leading end is or may be spliced onto the rear end of a previously run-out roll while the latter end is held, the lower roll frame 17 meanwhile rising in response to the call of the feed roller 15ª, so that the splice can be made without interrupting the slitting and gum-edging operations. These operations are carried on simultaneously in succession on different parts of the length of fabric passing through the apparatus, the wide fabric strip 18 being first progressively slit without substantial stretching tension, by the action of the cutters 34 whose lower peripheries rotate in the same general direction as the travel of the material, and the individual strips 41 being then spread apart by the action of the bowed wire roller 42 and passing up over the power-driven feed roller 44. From the slitting apparatus the strips 41 then pass through the fixed guides 61 into the space between the middle and lower calender rollers 51, 54 where they meet with the strips 64 of rubber compound from among those into which the sheet formed on the middle calender roller is divided by the gang of knives 55. The gum strips are adhesively applied in overlapping relation to the margins of the fabric strips as they pass over the lower calender roll. By passing around the rollers 65, 66, 68 the gum edging strips 64 are then turned around the edges of the fabric strips and adhesively applied to their lower faces. The gum-edged strips then pass onto the carrier belt 69, the adhesion of the plies is perfected by the presser roll 73 and the work is finally rolled up with the liner 82 into the roll 83.

By thus co-ordinating these several steps in a single series of operations, I attain a desirable increase in speed of production, obtain work of more uniform and higher quality, and substantially reduce the cost of production by eliminating several storing and handling steps heretofore required in this class of production.

The substitution of equivalents for the described means of performing the several steps of this series of operations, as well as the modification of the different instrumentalities in various ways, are contemplated as coming within the scope of the invention.

I claim:

1. In combination, a fabric slitter having power-driven in-feed and out-feed rollers, a rubber calender having a fabric roller, and means for coordinating the surface speeds of said rollers to feed the fabric substantially without stretching tension through the slitter and calender.

2. In combination, a fabric slitter having a rotary cutter, means for rapidly rotating said cutter in a direction coinciding with the travel of the fabric, means for feeding the fabric through the slitter without substantial stretching tension, and a rubber calender coordinated for operation with said slitter and having means for forming plastic rubber strips and applying them to the fabric strips.

In witness whereof I have hereunto set my hand this 30th day of March, 1929.

FRED B. PFEIFFER.